United States Patent [19]
Hagen

[11] 3,921,774
[45] Nov. 25, 1975

[54] GEAR UNIT WITH DISCONNECT CLUTCH

[76] Inventor: Donald H. Hagen, 4213 61st Ave. No., Minneapolis, Minn. 55429

[22] Filed: Oct. 31, 1974

[21] Appl. No.: 519,610

[52] U.S. Cl. ............... 192/85 CA; 74/405; 192/20; 192/112
[51] Int. Cl.² ......................................... F16D 25/08
[58] Field of Search.... 192/85 CA, 85 AA, 20, 112; 74/364

[56] References Cited
UNITED STATES PATENTS

| | | | |
|---|---|---|---|
| 2,775,328 | 12/1956 | Yokel | 74/364 X |
| 3,262,529 | 7/1966 | Kramer | 192/85 AA |
| 3,860,100 | 1/1975 | Spanke et al. | 192/85 CA |

Primary Examiner—Benjamin W. Wyche
Attorney, Agent, or Firm—James R. Cwayna

[57] ABSTRACT

A transmission unit particularly adaptable for use on power take off systems of vehicles or other sources of rotary power for selectively delivering rotary power from a first input shaft to a second geared output shaft. The unit may be engaged or disengaged while the input shaft is rotating and means for engaging the input to the output shaft include a plurality of clutch disc members mounted for slideable movement upon a common spline member which will then provide driving engagement between the gears of the transmission with means at the opposite end of the input shaft for fluidly applying engaging force to the clutch members. The driven set of clutch discs are slideably mounted on the common spline and the driving members are carried by the input shaft.

14 Claims, 5 Drawing Figures

GEAR UNIT WITH DISCONNECT CLUTCH

FIELD OF THE INVENTION

This invention relates generally to transmission devices which permit the continuous operation of an input shaft and which through a remotely operated clutch mechanism permit engagement and disengagement of the input shaft to an output shaft. The means for controlling clutch engagement is through a fluid system which includes either hydraulic or air systems.

BACKGROUND AND OBJECTS OF THE INVENTION

There are various applications where selective power transmission is required. In many of the present structures, in order to obtain a selective operation of an output shaft, it is necessary to totally control the input shaft such as by stopping the same before engaging the gearing required for the transmission of rotary power from the input to the output shaft. Also in many of these situations, a mechanical shifting technique is utilized.

With applicant's device a unique transmission unit is provided which is adaptable for use with power take off systems of vehicles or with other systems wherein a first source of rotary power is provided. The transmission includes means for intermittently or continuously affording output shaft power. The arrangement provided herein includes means for remotely controlling the engagement of the input to the output shaft which will allow the input shaft to be continuously operated.

In addition to these operative characteristics, applicant provides a unique clutching arrangement wherein the driven clutch plates are mounted on a longitudinally splined member which splined member also carries a first driving gear with the driving plates being mounted in clutching relation to the driven plates and being driven by the input shaft. These driving plates must also be slideably mounted on extending arms on a portion of the input shaft. This concept gives an extremely compact arrangement when associated with the means for bringing the clutch plates into engagement.

It is therefore an object of applicant's invention to provide a transmission device including means for engaging an input to an output shaft for selective intermittent or continuous connection therebetween.

It is a further object of applicant's invention to provide a transmission device having at least an input shaft and an output shaft with clutch means arranged in surrounding relation to the input shaft and means for actuating the clutching mechanism being in longitudinal alignment with the input shaft.

It is still a further object of applicant's invention to provide a transmission device having clutch actuating means consisting of a movable cylinder member the movement thereof being controlled by fluid pressure which fluid pressure includes either air, other gases or hydraulic pressure.

These and other objects and advantages of the invention will more fully appear from the following description made in connection with the accompanying drawings in which the same numeral is used to designate the same or similar parts throughout the several views, and in which.

Figure 3:
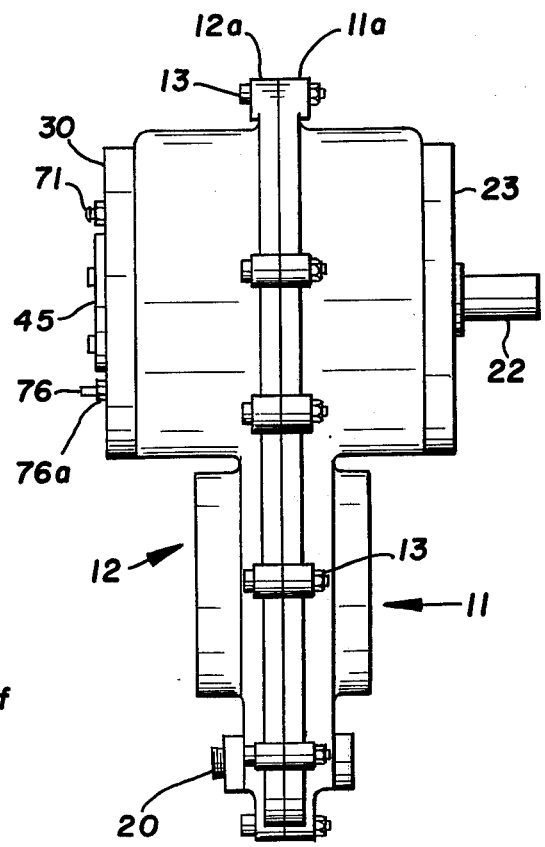
FIG. 3 is a side elevation of the transmission unit.
Figures 4, 5:
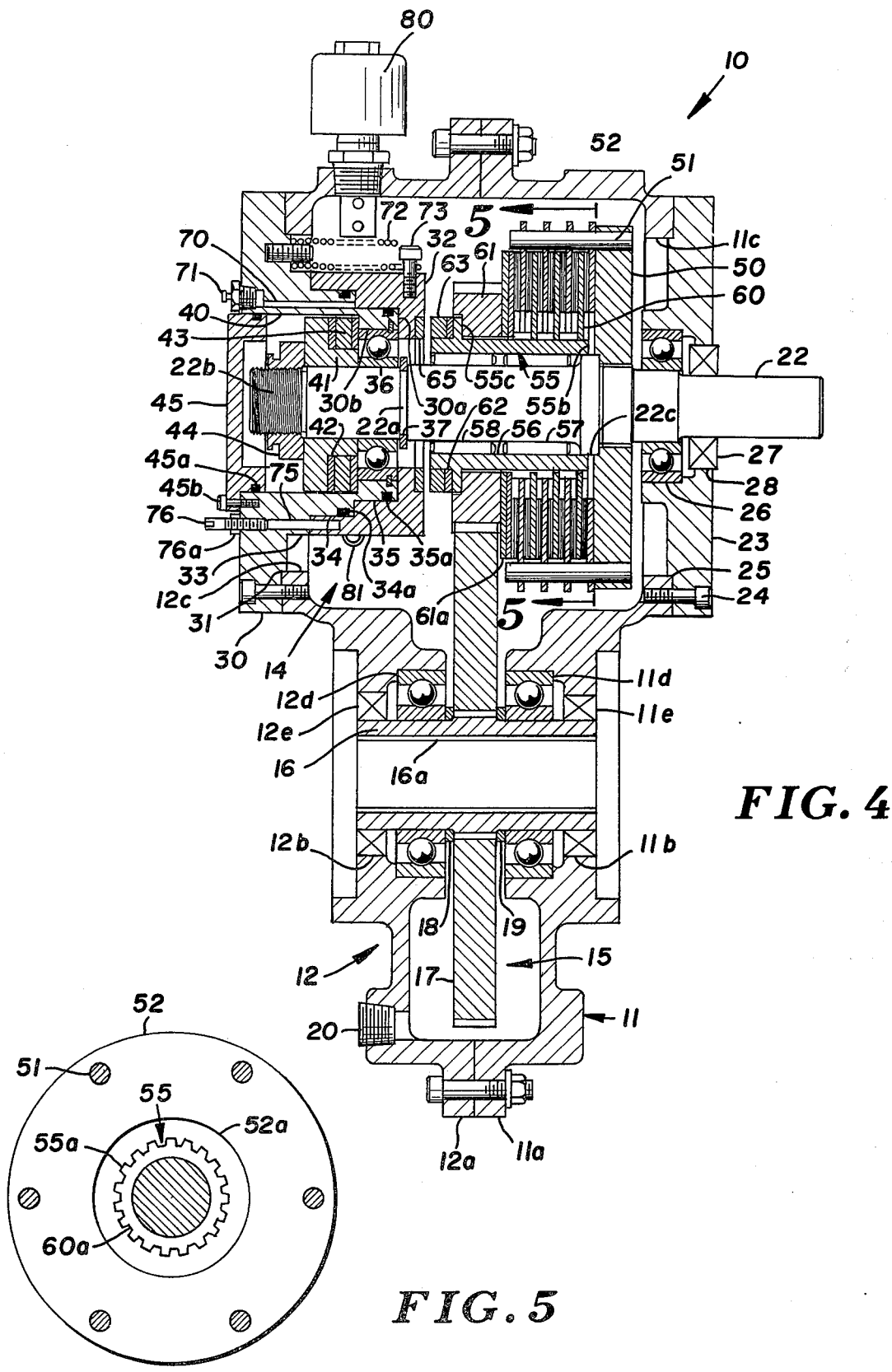
FIG. 4 is a vertical section taken substantially along Line 4—4 of FIG. 2.
FIG. 5 is a vertical section taken substantially along Line 5—5 of FIG. 4 particularly illustrating the splined configuration utilized in the device.

As illustrated in the accompanying drawings, applicant's transmission 10 is provided, as best illustrated in FIGS. 3 and 4, with a housing formed of a pair of identical castings. These castings will be termed for convenience sake, an input casting 11 and a control casting 12. The castings are provided with peripheral flanges 11a, 12a which will permit the same to be secured together in sealing relationship. Obviously a plurality of attachment members 13 will be provided through appropriate openings in the flanges 11a, 12a for attachment thereof. The castings are provided with two basic apertures 11b, 12b and 11c, 12c. As the shafts of the unit, as will be discussed hereinafter, establish certain longitudinal directions, it may be stated that the longitudinal distances, in the form shown, between the apertures 11b, 12b is substantially less than the longitudinal dimensions between apertures 11c, 12c. The obvious reason for this dimensioning is simply a matter of choice as what may be termed the input or operative area 14 of the unit must be substantially greater than the output area 15.

The output portion 15 of the transmission will be described initially.

A pair of bearing members 11d, 12d are arranged in respective castings 11, 12 and dust seals 11e, 12e or the like are provided in passages 11b, 12b. A shaft member 16 having internal splines 16a is provided within the bearings 11d, 12d and this internal splining is provided as a matter of choice in that splined output shafts may be received therein from either side if so desired.

Drive shaft 16 is also provided with an external spline portion 16b generally centrally thereof and the purpose of this spline 16b is to permit the output gear 17 to be changed for different gear ratios as desired. Spacer members 18, 19 are illustrated between the inner races of bearings 11d, 12d and this splined section 16b.

An oil drain plug 20 is illustrated as being provided in casting 12.

Figure 1:
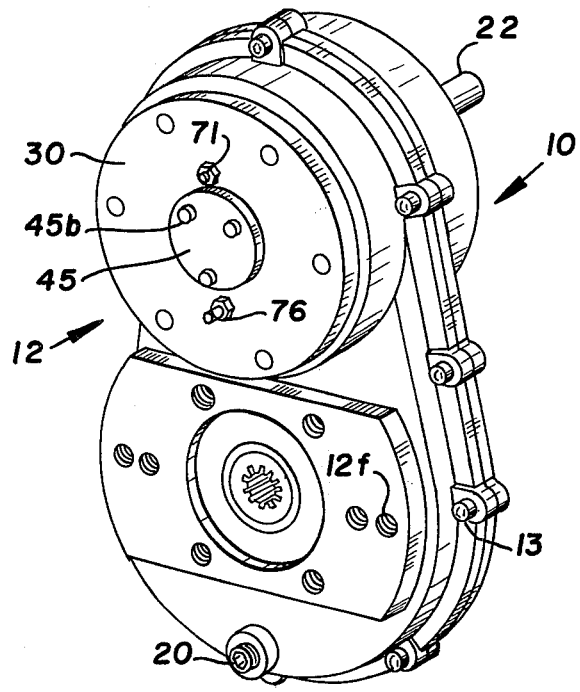
FIG. 1 is a perspective view of a transmission unit embodying the concepts of applicant's invention.
Figure 2:
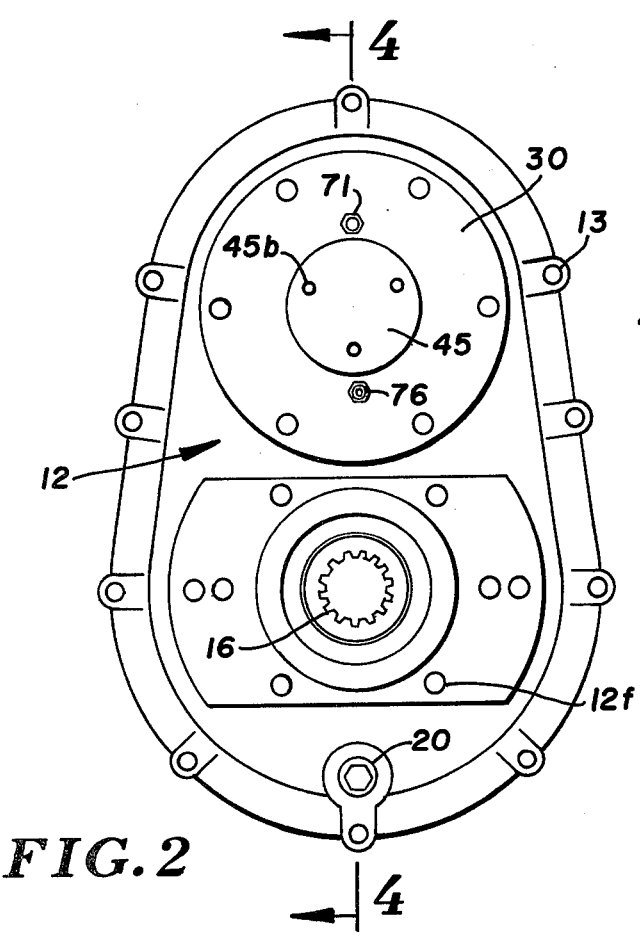
FIG. 2 is a front elevation of the transmission unit.

As illustrated in FIGS. 1 and 4, a plurality of attachment apertures 12f may be provided for attachment of additional units to the output section of the transmission 10. Obviously, these same apertures may be provided on casting 11.

The operative or input end of the unit includes an input shaft 22 designed to extend substantially longitudinally across the unit and means must be provided to mount this shaft 22 on each of the castings 11, 12. Mounting of the shaft 22 on casting 11 is obtained by providing a cover plate 23 secured to casting 11 through plurality of attachment bolts 24. An inner shoulder 25 is provided on cover 23 to be received in aperture 11c of casting 11 for proper centering of shaft 22. A first bearing member 26 is provided in closure cover 23 and its outer race is shouldered against a passage formed internally of cover 23. An oil seal or the like 27 is also provided in an aperture 28 of the cover 23 and the shaft 22 is arranged to rotate upon the inner race of the bearing 26 and the seal 27 of course will wipe against the outer diameter of the shaft 22.

The means for mounting the inboard end of shaft 22 include a closure cap 30 again having an internal shoulder 31 to abut with the aperture 12c. This cover member 30 provides a plurality of reduced diameter portions which will provide longitudinally inwardly directed shoulders and will provide surfaces upon which an actuating piston 32 will slide. It should be obvious that at each decrease in diameter a longitudinally inwardly directed shoulder will exist.

A first area of such reduced portion is designated 33, the second such area is designated 34 and an o-ring seal 34a or the like is provided thereon and the third such reduced portion is designated 35 which portion is also provided with a seal 35a thereon. The most inwardly extending end 30a is provided with a bearing receiving aperture 30b therein and a bearing 36 is provided therein with means for positively retaining such bearings 36 in the sperture 30b. Obviously two bearings 26 and 36 are now provided and the shaft 22 is free to rotate within these bearings.

Means must be provided to prevent movement of the shaft longitudinally within the bearings. When considering FIG. 4, movement of the left in the drawing is prevented by providing a groove 22a about shaft 22 and a locking ring 37 or similar unit is provided therein which will abut with the inner race of bearing 36a.

Means must likewise be provided to prevent movement of shaft 22 to the right.

An axial bore 40 is provided generally centrally of cover 30 and this bore is of greater diameter than the opening 30b to receive the bearing 36. A bearing spacer 41 is provided about the periphery of shaft 22 and is also provided with an L-shaped shoulder configuration 42 upon which a thrust bearing 43 is provided. The size of this thrust bearing will permit the same to abut with the outer race of bearing 36.

In order to now position the shaft properly, the external end 22b of the shaft is threaded and a jam nut 44 is provided thereon to abut with the spacer bearing 41. Tightening of this jam nut 44 will bring the stop 37 against the inner race of the bearing and will bring the thrust bearing 43 against the outer race of the bearing. A second closure cover 45 is provided to be received into bore 40 and be sealed thereagainst with seal 45a and held thereto through capturing elements 45b spaced therearound.

The clutch and driving mechanism includes a radially extending drive plate member 50 secured to the input shaft 22 for rotation therewith. A plurality of inwardly directed, longitudinally extending pin members 51 are spaced radially on said plate about the periphery thereof. A plurality of clutch driving plates 52 are arranged on these pins 51 and are provided with frictional material on either side thereof to obtain driving engagement with driven clutch plates. Obviously the number of these driven plates 52 will depend upon the surface area necessary for the power to be delivered. Obviously these driven plates 52 are provided with a passage 52a generally centrally thereof.

Arranged about the input shaft 22 is a longitudinally splined and longitudinally extending member designated generally 55. This member 55 is provided with an internal bore 56 of greater diameter than the diameter of input shaft 22 that it surrounds and a plurality of needle bearings 57, 58 are provided in the area between the internal diameter of the splien member 55 and the external surface of the input shaft 22. A radially extending shoulder 22c may be provided adjacent the drive plate 50 such that one end of the spline member 55 may ride thereupon.

Spline member 55 is provided with longitudinally extending splines 55a arranged about the periphery thereof and these splines 55a extend from what may be termed a free end 55b longitudinally along the member 55 to a radially extending shoulder 55c on the inwardly extending end of the member 55.

A plurality of driven clutch plates 60 provided with internally directed splines 60a are arranged with these splines 60a in mating configuration with the splines 55a of member 55 such that they may be moved longitudinally therealong. Obviously, friction material is arranged on each of these driven clutch plates 60 and they are so arranged as to be intermediate the driving clutch plates 52.

A gear member 61 is also arranged on the splines 55a of the spline member 55 and is arranged to abut with the radially extending shoulder 55c of member 55. It should be noted that this gear is of slightly greater width than the driven gear 17 with which it is in mesh as gear 61 is required to be moved longitudinally with respect to shaft 22 as will be explained hereinafter.

Arranged forwardly of the radially extending shoulder 55c is a smoothly diametered surface 62 and a thrust bearing 63 is arranged thereon.

At this point, it should be obvious that longitudinal pressure to the right upon the spline member 55 will bring the gear 61 to the right to compress against a bearing plate 61a which bearing plate will then compress the clutch plates 52, 60 together such that rotary transmission will be transferred from the driving plate 50, through the pin members 51 and the driving clutch plates 52 through the driven plates 60 and therefore will cause rotation of the spline member 55 and the spline gear 61 to thus drive the gear 17 and the output shaft.

The importance of this splined member should be obvious in that it does permit the longitudinal plate clutch movement while insuring positive rotation of the necessary driving gear 61. This splined member is of a one-piece die cast construction. The shape of this member would be difficult if not impossible to machine.

Means for obtaining this clutch engaging movement is controlled by the movement of the aforementioned piston 32. This piston 32 is provided with radially inwardly directed areas of reducing diameter which agree with the areas of reduced diameter of cover 30. Obviously the relationship of this shoulder arrangement provides a piston-cylinder arrangement. It should be noted that a bearing race 65 of a size to agree with thrust bearing 63 is provided on the inwardly extending face of the piston 32 such that longitudinal inward movement of piston 32 will result in the race 65 abutting with the thrust bearing 63.

Means for shifting the piston 32 into clutch engagement position is obtained by providing a passage 70 through cover 30 having inlet means 71 extending externally from the cover 30 and having the inner end of this passage positioned to direct fluid into the reduced shoulder portion provided between the seal members 34a, 35a. It is immaterial whether this pressurizing fluid be gaseous or liquid. Valving means must be provided for the input of fluid into passage 70 and to allow the same to be withdrawn therefrom for the ultimate return of the piston 32.

In order to return the piston 32 to clutch disengaging position, a plurality of extension springs 72 are provided at radial locations about cover 30 and extend inwardly therefrom. These springs 72 are fastened positively to the inner surface of cover 30 and must be fastened to, as through radially extending capturing screws 73, piston 32. Upon release of the fluid pressure, these springs 72 will retract the piston 32 thus permitting the spline member 55 to release pressure from the clutching surfaces of the clutch plates 52, 60.

In order to maintain the degree of movement between the piston bearing race 65 and the thrust bearing 62, a control rod assembly is provided. This control rod assembly includes a pin member 75 positively received into the piston 32 and extending outwardly therefrom to extend through a passage formed in cover 30. The outer position of the passage through cover 30 is threaded and a stop element 76 is threaded therein which stop element is provided with a lock-nut 76a for positively holding the same in position after such setting. This pin member 75 will not only provide for proper setting of the disengage gap but will also prevent the piston 32 from rotating.

Two other elements which are illustrated in the drawings but have not been previously discussed include an oil filling and an air filter device which is designated 80 and which is arranged at the upper end of either of the castings 11, 12, In addition to this an oil level check 81 is provided in either of the casings.

From the foregoing description, the operation of the unit should be obvious. Rotary power is introduced through shaft 22. When the clutch control piston 32 is retained by spring elements 72 and no pressurized fluid exists in passage 70, the clutch plates will not be in engaging position and no rotation of the spline member and the attached gear 61 will result. This of course would result in no rotation of gear 17 and the output shaft 16 and any members received thereon. Upon the delivery of fluid under pressure, through the sperture 70, which pressure obviously must be great enough to overcome the pressure of the springs 72, the piston 32 will be forced to the right and this will thus force the spline member 55 to the right thus compressing or thus bringing the clutch plates into face to face engaging relationship which will result in rotation of the driven plates which will result in rotation of the spline element 55 about the input shaft 22. Obviously the thrust bearing 63 is necessary to permit such rotation. Rotation of the spline element will result in rotation of gear 61 and thus gear 17.

The applicant's unit has been provided to permit gearing changes and a multiplicity of ratios may be obtained simply by changing the two gears.

It should be obvious that applicant has provided a unique transmission device which includes an input shaft with a clutching mechanism receiveable thereabout and with a control with for engagement of the clutching mechanism in alignment with the input shaft such that a compact unit is provided and one in which positive clutching action may be obtained while the input shaft is rotating.

What I claim is:
1. A transmission unit including:
 a. a housing having at least a pair of longitudinally spaced sides;
 b. an input shaft extending into said housing through one side thereof and being bearingly mounted for rotation on said side;
 c. bearing means on said other side of said housing and rotatably receiving the inwardly extending end of said input shaft;
 d. at least one driving clutch plate carried by said input shaft for rotation therewith;
 e. a longitudinally externally splined member rotatably received about said input shaft and longitudinally shiftable therealong;
 f. at least one driven clutch plate having splined connection to said splined member;
 g. a first gear member carried by said splined member;
 h. an output shaft and second gear rotatably mounted on the sides of said housing, said first and second gear being in constant mesh;
 i. said driven clutch plate and said splined member being arranged in relation to said driving clutch plate for shifting thereof into and out of driven relation with said driving clutch; and,
 j. means for shifting said splined member and said driven clutch plate into driven relation with said driving clutch plate, said shifting means being arranged about the inwardly extending end of said input shaft.

2. The structure set forth in claim 1 and:
 a. a generally circular drive plate carried by said input shaft;
 b. a plurality of arcuately spaced, inwardly extending pin members carried by said plate;
 c. a plurality of driving clutch plates carried by said pins and being longitudinally shiftable therealong; and,
 d. a plurality of internally splined driven clutch plates arranged for longitudinal sliding movement on said splined member and each being arranged for clutching relation with said driving plates.

3. The structure set forth in claim 1 and said splined member including:
 a. a first longitudinally extending, externally splined section;
 b. a radially extending shoulder adjacent said splined section;
 c. a longitudinally extending bearing receiving section adjacent the opposite side of said extending shoulder; and,
 d. a passage longitudinally through said member.

4. The structure set forth in claim 3 and said splined member being of cast construction.

5. The structure set forth in claim 3 and said first gear being positioned against said radially extending shoulder.

6. The structure set forth in claim 5 and a bearing member arranged between said gear and said driven clutch plates.

7. The structure set forth in claim 1 and a shiftable piston member carried by said other side of said housing, said piston member being longitudinally shiftable into engagement with said splined member for shifting of the same and the driven plates carried thereby into driving relation.

8. The structure set forth in claim 7 and a cylinder carried by said other side of said housing, and extending into said housing, said bearing means being mounted internally thereof and said piston being longitudinally movably mounted on the exterior surface of said cylinder.

9. The structure set forth in claim 8 and means for shifting said piston including means for introducing fluid under pressure between said cylinder and said piston.

10. The structure set forth in claim 9 and the fluid including gas.

11. The structure set forth in claim 9 and the fluid including hydraulic fluid.

12. The structure set forth in claim 8 and means for introducing and releasing fluid between said cylinder and piston to control the movement of said piston.

13. The structure set forth in claim 12 and spring means for retracting said piston upon release of said fluid pressure.

14. The structure set forth in claim 7 and an adjustment means extending through said other side and adjustable into engagement with said piston whereby the distance between said piston and said splined member may be controlled.

* * * * *